(12) United States Patent
Erdman et al.

(10) Patent No.: US 6,955,479 B2
(45) Date of Patent: Oct. 18, 2005

(54) OPTICAL FIBER CONNECTOR WITH FERRULE RADIAL ORIENTATION CONTROL

(75) Inventors: David Donald Erdman, Hummelstown, PA (US); Michael Lawrence Gurreri, York, PA (US); Randy Marshall Manning, Lemoyne, PA (US)

(73) Assignee: Tyco Electronics Corporation, Middletown, PA (US)

( * ) Notice: Subject to any disclaimer, the term of this patent is extended or adjusted under 35 U.S.C. 154(b) by 62 days.

(21) Appl. No.: 10/637,751

(22) Filed: Aug. 8, 2003

(65) Prior Publication Data

US 2004/0101254 A1 May 27, 2004

Related U.S. Application Data

(60) Provisional application No. 60/401,901, filed on Aug. 8, 2002.

(51) Int. Cl.$^7$ ................................................ G02B 6/36
(52) U.S. Cl. ....................................................... 385/78
(58) Field of Search .............................. 385/78, 55, 76, 385/77, 85

(56) References Cited

U.S. PATENT DOCUMENTS

| | | | |
|---|---|---|---|
| 5,458,528 A | | 10/1995 | Lurie et al. |
| 5,809,192 A | * | 9/1998 | Manning et al. ............... 385/78 |
| 6,206,581 B1 | * | 3/2001 | Driscoll et al. ................ 385/78 |
| 6,398,423 B1 | | 6/2002 | Novacoski et al. |
| 6,595,697 B2 | * | 7/2003 | Hirabayashi et al. .......... 385/78 |
| 6,655,851 B1 | * | 12/2003 | Lee ............................. 385/78 |

FOREIGN PATENT DOCUMENTS

| | | |
|---|---|---|
| DE | 3701421 | 7/1988 |
| EP | 0780710 | 6/1997 |
| EP | 0940700 | 9/1999 |

* cited by examiner

*Primary Examiner*—Javaid H. Nasri

(57) ABSTRACT

A method of assembling an optical fiber assembly comprising the steps of: (a) providing a ferrule sub-assembly comprising a ferrule having a front end and a fiber secured therein and a positioning member; (b) positioning the ferrule sub-assembly in a housing adapted to receive the positioning member in a plurality of predetermined radial positions; (c) preparing the front end such that the fiber is suitable for optical coupling with a mating device; (d) rotating the ferrule sub-assembly to at least a portion of the plurality of predetermined radial positions within the housing while measuring the power loss associated with each radial position to determine the optimal radial position; and (e) optionally polishing the end of the ferrule into the desired configuration after the optimum radial position is determined.

9 Claims, 3 Drawing Sheets

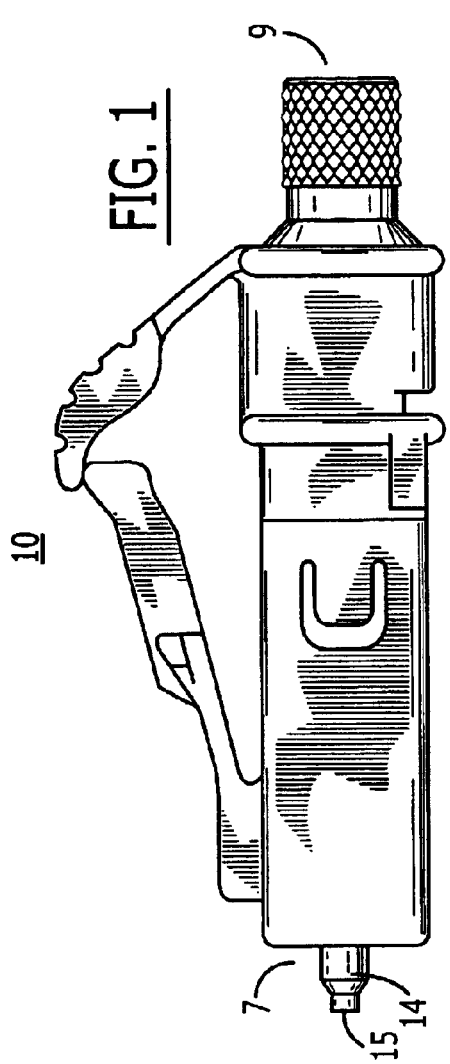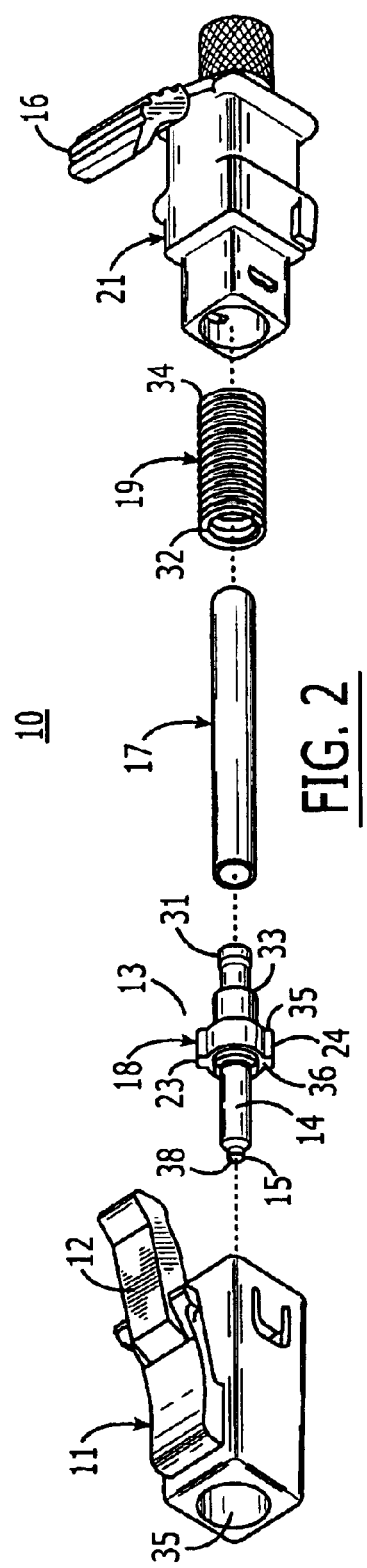

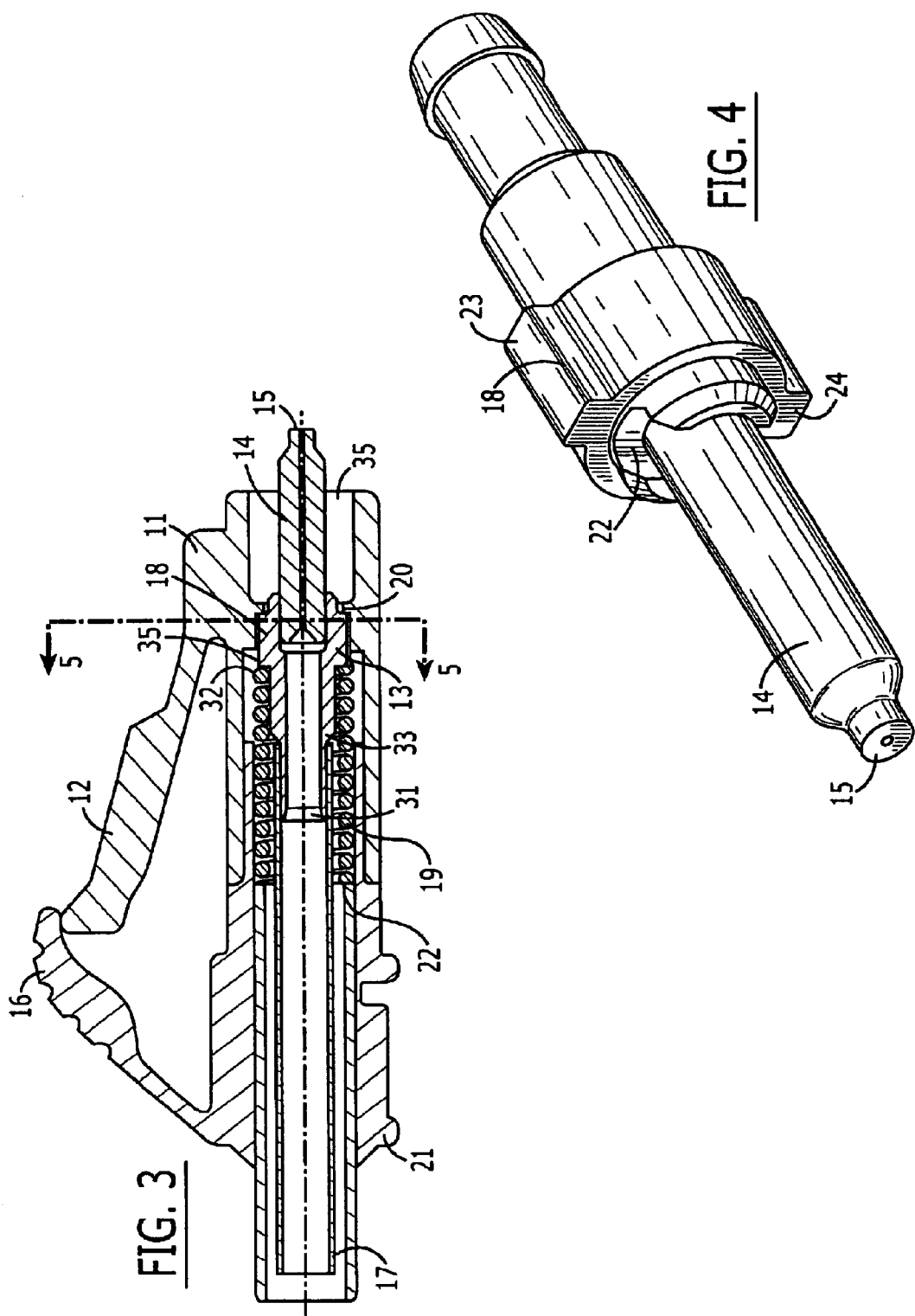

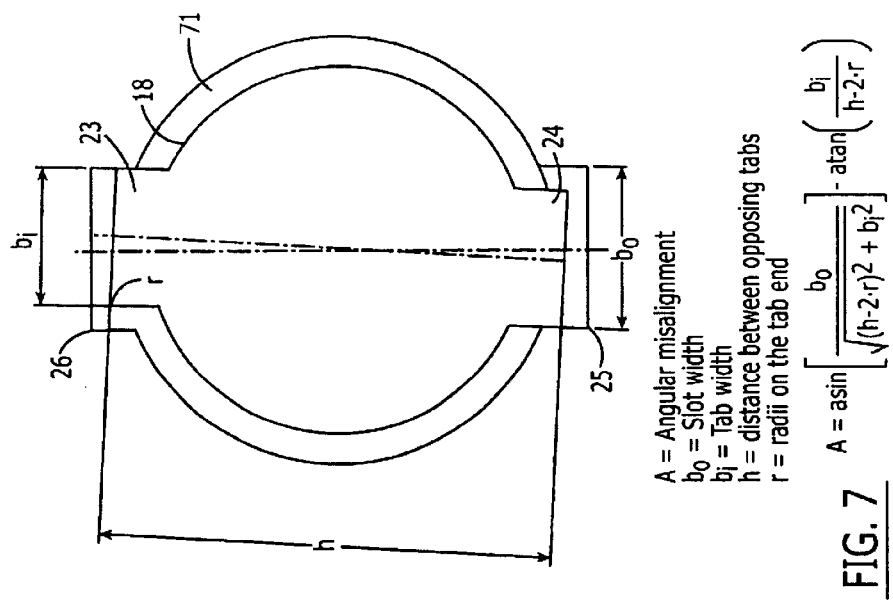
FIG. 7
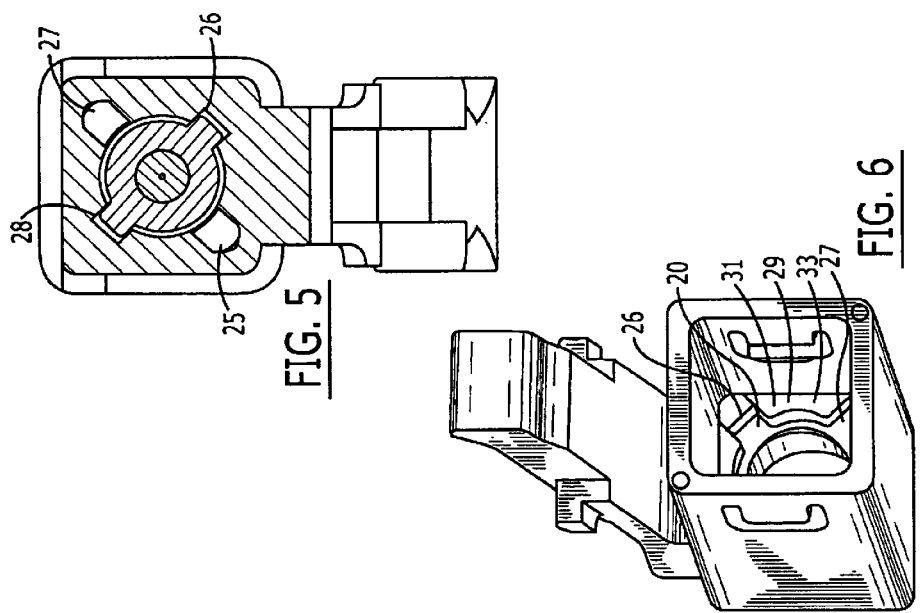
FIG. 5
FIG. 6

OPTICAL FIBER CONNECTOR WITH FERRULE RADIAL ORIENTATION CONTROL

REFERENCE TO RELATED APPLICATION

This application claims priority to U.S. Provisional Application No. 60/401,901, filed Aug. 8, 2002, and hereby incorporated by reference.

FIELD OF INVENTION

The present invention relates generally to an optical fiber connector, and, more specifically, to an optical fiber connector in which the ferrule position relative to the connector housing is adjustable.

BACKGROUND OF INVENTION

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of optical fiber connectors is to hold an optical fiber such that its core is axially aligned with the optical path of the device to which the connector is mating (e.g., another fiber). This way, the light from one fiber is optically coupled to the optical path of the mating device.

It is common in applications using single mode fibers to use connectors that ensure physical contact between the fibers in order to reduce power losses, such as Fresnel losses. These connectors are known as physical contact (PC) connectors or angled physical contact (APC) connectors. PC connectors create a physical contact between two fibers that have been polished flat on the fiber ends. APC connectors ensure physical contact between two fibers that have polished beveled end faces. The beveled end face is usually about 8° off perpendicular from the optical transmission path of the fiber, and insures that any light which is reflected from the end face interface is not reflected back down the optical transmission path. This way, damage to the light generating source (e.g. laser) is avoided. Since the end faces of mating optical fibers in an APC connector are beveled, if they are not rotationally aligned with one another, their bevels will not be complementing. Instead, they would be interfering such that a gap between the end faces results when the fibers are mated. Therefore, to ensure that the beveled end faces mate in a complementary fashion, it is essential that each fiber be held in the mating connectors in a particular rotational position.

Other fiber types also require precise rotational alignment of the fiber. Polarization maintaining (PM) fibers (i.e., PANDA fibers or bifringent fibers) have a particular orientation to the path that the light within the fiber travels. Connectors for these fibers need to ensure that the rotational alignment of the fibers is kept constant across the fiber connection in order to preserve the state of linear polarization from a coherent laser source (e.g., a distributed feedback laser). The orientation is determined by measuring the relative power between the two orthogonal fiber axes (i.e., the extinction ratio) prior to assembling the connector. During assembly, the fibers are kept in the predetermined position to avoid radial misalignment.

Conventional methods of rotationally aligning fibers require the fibers to be polished and the proper alignment position to be measured prior to the assembly of the connector. As a result, however, such connectors are subject to optical power loss caused by eccentricities within the connector. Often times, when a fiber is affixed to a ferrule, its center location is eccentric relative to the outer diameter of the ferrule. The cause of the eccentricity can be because the fiber core is not perfectly concentric within the optical fiber, or because the bore hole in the center of the ferrule might not be perfectly concentric relative to the ferrule outside diameter, or because the fiber might not reside perfectly concentric in the bore hole. All of these conditions can result in the cores of the two mating fibers in a connector unit failing to be perfectly aligned. Eccentric misalignment of the fiber cores creates optical power loss across the fiber connection.

Correcting for core eccentricities would require the mating ferrules of a connector to be positionally adjusted relative to one another. However, in existing connectors such adjustment is not possible because it would result in a loss of the rotational alignment of the fibers with respect to each other. For example, an APC connector could not be adjusted at this point because the beveled faces of the fibers would lose their complementing position. A connector using PM fibers could not be adjusted at this point because the polarizing rotational alignment of the fibers has been predetermined and would be lost by any further adjustment. Because any rotational alignment of the fibers is performed prior to connector assembly, conventional connectors do not allow for ferrule adjustment to reduce such losses caused by eccentricities.

There is a need for a connector that allows the eccentricities of the fiber cores to be minimized, while maintaining the fiber rotational alignment when necessary such as in PM applications and APC applications. The present invention fulfills this need among others.

SUMMARY OF INVENTION

The present invention provides a method for establishing the rotational orientation of a ferrule containing an optical fiber connector to minimize losses caused by fiber core eccentricities. Specifically, the method of assembly in accordance with the present invention comprises (a) bonding a fiber within a ferrule having an end face such that an end of the fiber is presented at the end face; (b) positioning the ferrule within a housing; (c) preparing the end face of the ferrule such that the fiber secured therein is suitable for optical coupling to a mating component; (d) rotating the ferrule to a plurality of predetermined radial positions within the housing while measuring the power loss associated with each radial position to determine the optimal radial position; and (e) optionally polishing the end of the ferrule into the desired configuration after the optimum radial position is determined.

Accordingly, by rotating the ferrule and fiber simultaneously, any eccentricities that exist with respect to the fiber core can be orientated with respect to a particular area or segment of the connector. For example, in a connector with four predetermined positions, the mating surface of the connector is divided into four virtual quadrants. By tuning the connector in such a manner that any core eccentricities within the ferrule/fiber combination are orientated with respect to the same quadrant as the mating connector, more precise fiber alignment is achieved. This reduces insertion and Fresnel losses across the connection. Furthermore, because the beveled ends in an APC application are applied after the ferrule position has been selected, there is no concern of losing the complementing configuration.

Another aspect of the present invention is an optical fiber connector assembly that allows for post-assembly adjustment of the rotational position of the ferrule and fiber. In a preferred embodiment, the assembly comprises: (a) a ferrule sub-assembly comprising a ferrule containing an optical fiber having a front face, and a positioning member for maintaining the radial position of the ferrule sub-assembly in a selected position; (b) a front housing having a plurality of recesses in preselected radial positions for receiving the positioning; (c) a resilient member for urging the ferrule sub-assembly forward into the front housing such that the positioning member is held one of the recesses; and (d) a rear body to provide a back stop for the resilient member. Accordingly, the ferrule sub-assembly is capable of being rotated within the front housing and rear body, and is held into the selected position by having the resilient member urge the positioning member of the ferrule sub-assembly into one of the plurality of recesses formed inside the front housing.

The rotational positioning of the ferrule assembly is accomplished using a tool that is inserted into the assembly. The tool engages with one or more slots located on the ferrule sub-assembly, allowing the operator of the tool to control the rotation of the ferrule within the housing of the assembled connector. The sub-assembly is depressed, which releases the positioning member from the recesses in the housing and allows the sub-assembly to rotate freely. When the desired rotation is achieved, the tool is removed. The resilient member urges the ferrule sub-assembly forward, and the positioning member engages the corresponding recesses in the housing to fix the sub-assembly position.

Accordingly, by selecting the ferrule sub-assembly position that orientates the eccentricities into corresponding areas on two mating connectors, power loss is minimized. Furthermore, time and effort necessary to build a connector assembly is reduced because the connector can be assembled prior to rotational alignment and polishing of the fiber end. An additional advantage of this approach is that the connector may be assembled at a different time and place from the tuning and polishing, thus allowing for various levels of labor cost/skill to be used for the various operations.

Preferred embodiments use four or two predetermined ferrule positions; however, it is understood that any number of positions could be used for single mode PC and APC applications. The larger the number of positions available for selection, the more accurately the fiber cores can be aligned. A two position connector is optimum for PM applications, whereby the fibers need to maintain a specific polarizing orientation with respect to one another, and thus can only be rotated 180 degrees in order to maintain said orientation. Two positions nevertheless still provide for orientation of eccentricities, and thus for a reduction in their associated losses.

BRIEF DESCRIPTION OF DRAWINGS

FIG. 1 shows a side view of the assembled connector in accordance with a preferred embodiment of the present invention.

FIG. 2 shows an exploded view of the components of the connector of FIG. 1.

FIG. 3 shows a cross-sectional view along of the connector of FIG. 1, cut along the length of the fiber path.

FIG. 4 shows a detailed view of the ferrule sub-assembly.

FIG. 5 shows a cross-sectional view of the connector of FIG. 3, cut perpendicular to the fiber path as indicated by the cut line 5—5 shown in FIG. 3.

FIG. 6 shows a rear perspective view of the front housing of the connector.

FIG. 7 shows the alignment relationship between the positioning member and the slots in the front housing.

DETAILED DESCRIPTION OF PREFERRED EMBODIMENT

A preferred embodiment of the present invention is shown in FIGS. 1 through 6. The figures show an optical fiber connector assembly. The illustrated connector is an LC type connector, although the invention is not limited to this connector type and may be practiced with other connector types such as the SC-, FC-, and MU-connectors.

FIG. 1 shows a connector assembly 10 in accordance with the present invention in the assembled configuration. The connector assembly 10 has a front end 7 and a rear end 9. The present invention shall be discussed with reference to a single connector assembly 10; however, in use a pair of connector assemblies 10 would be joined by inserted the front end 7 of a first connector assembly 10 into an adapter where it would couple with the front end 7 of a second connector assembly 10. The front face 15 of a ferrule 14 contained within the first connector assembly would contact the front face 7 of a second connector assembly 10 to provide for connection between the optical fibers contained within the ferrules.

FIG. 2 shows an exploded view of the connector assembly of FIG. 1, illustrating all of the various components contained with connector assembly 10. Referring to FIG. 2, the connector assembly 10 comprises: (a) a front housing 11, (b) a ferrule sub-assembly 13 comprising a ferrule 14 having a front face 15 and containing a single mode optical fiber 38, and one or more positioning members 18, (c) a length of tubing 17, (d) a resilient member 19, and (e) a rear body 21. A latch 12 is formed on the front housing 11 to secure the connector assembly into an adapter (not shown) for mating with a corresponding connector. A release mechanism 16 engages with the latch 12 when the connector is in its assembled configuration. The release mechanism is used to depress the latch 12 to allow the connector assembly 10 to dis-engage from the adapter.

FIG. 3 shows a cross-sectional view of the connector in its assembled configuration. The ferrule sub-assembly 13 resides within the front housing 11. The front face 15 of the ferrule protrudes through an opening 35 of the front housing 11 into a position where it will physically contact the front face of a mating connector when the connector assembly 10 is mated by inserting the assembly into an adapter containing a second connector assembly. The rear 31 of the ferrule sub-assembly 13 fits into the length of tubing 17. The rear of the ferrule sub-assembly 13 is stepped to create a stop 33 such that the amount of the rear of the ferrule sub-assembly 13 that can be insert into the length of tubing 17 is limited. The resilient member 19 surrounds the rear of the ferrule sub-assembly 13 and the front of the length of tubing 17. The entire combination of the rear of the ferrule sub-assembly 13, the length of tubing 17, and the resilient member 19 resides within the rear body 21.

To provide a backstop for the resilient member, the rear body 21 is configured with a landing 22 against which the rear end of resilient member 19 is configured to seat. The front end 32 of the resilient member engages the rear side 35 of the positioning member 18 on ferrule subassembly 13. The compressive force of the resilient member 19 against the landing 22 causes the resilient member 19 to urge the ferrule sub-assembly 13 forward relative to the front housing 11 until the positioning member 18 of the ferrule subassembly 13 contacts the a stop shoulder 20 located on the inside of the front housing 11. When the positioning member 18 is in contact with the shoulder 20, the front face 15 of the ferrule sub-assembly 13 extends out the front end of the front housing 11.

A rear perspective view of the front housing 11 is shown in FIG. 6. Slots 26, 27 are formed on the inner surface of the front housing 11. The floor of these slots forms stop shoulder 20. Referring again to FIG. 2, the positioning member 18 of the ferrule subassembly 13 contains two locating tabs 23,24. When the ferrule subassembly is urged forward by the resilient member 19, the locating tabs 23, 24 seat within the slots on the inside of the front housing 11. The engagement of the tabs within the slots fixed the rotational position of the ferrule subassembly 13, thus preventing the subassembly from rotating within the front housing 11. The front surface of the tabs 23, 24 contacts the floor of the slots, stop shoulder 20, to prevent the ferrule sub-assembly from traveling further forward.

To allow for the fiber to be tuned (i.e., the segregation of all eccentricities into one particular quadrant) the ferrule sub-assembly 13 can be rotated within the front housing 11. In order to perform the tuning, the sub-assembly is depressed using a tool configured to mate with the front surface 36 of the positioning member 18 on the ferrule sub-assembly 13. The ferrule sub-assembly 13 is shown in detail in FIG. 4. The positioning member 18 is configured with two mating slots (only one mating slot 22 shown) on opposite sides of the ferrule 14. The mating slots are aligned with the two positioning tabs (23,24) located on the positioning member 18. Referring again to FIG. 3, a tool is inserted into the front opening 35 of the front housing 11 and couples with the slots located on the positioning member 18. The tool is not illustrated, but a preferred embodiment of the tool comprises a screwdriver like device with two prongs extending from a handle, with the prongs corresponding to the mating slots. Using the tool, the entire ferrule subassembly is pushed inward towards the rear of the connector. This causes the resilient member 19 to compress, allowing the ferrule subassembly 13 to move away from the front housing 11. The tabs 23, 24 on the positioning member 18 release from their engagement with the slots on the inside of the front housing 11. Once the tabs 23, 24 have fully disengaged from the slots in the front housing 11, the ferrule sub-assembly can rotate within the connector assembly.

Although the connector configuration depicted herein shows the positioning member having tabs which are received in recesses in the front housing, it should be understood that other radial positioning techniques may be used. For example, the tabs may be located on the front housing and the recesses may be located on the positioning member.

By rotating the ferrule assembly, any eccentricities in the core will be rotated about the true center of the ferrule. In the illustrated embodiment, the positioning member 18 contains two tabs 23, 24 and the inside of the housing contains four slots. This provides for four positions in which the ferrule sub-assembly can be set. The ferrule sub-assembly is set in one of the four positions and then the connector assembly is inserted into an adapter containing a corresponding connector assembly. The optical power across the connector pair is measured. The ferrule sub-assembly is then rotated to the next position, and the process is repeated. In this manner, the position that yields the lowest power loss is determined. This is the position where all of the eccentricities are segregated into the same sector for both mating connectors. While a preferred embodiment uses four positions, it is understood that any number of positions can be used. The higher the number of positions available, the more "fine tuning" that can be done to obtain the lowest amount of power loss due to eccentricities.

Referring to FIG. 5, the mating between the positioning member 18 and the front housing 11 is shown. FIG. 5 is a cut view of the connector of FIG. 3, cut along the line 5—5 of FIG. 3. The front housing 11 is configured with four positioning slots formed in the passageway where the ferrule subassembly 13 resides. The four positioning slots are divided into two pairs, with each pair having a different slot configuration on the outer end. Two of the positioning slots (25, 27) are rounded at the outer end, and these two slots are located opposite from one another. The remaining two slots (26, 28) are flat at the outer end, and comprise the second pair of slots located opposite one another. By configuring the slots in this manner, the front housing can be used in PM applications where only a two position adjustment is possible. A PM fiber has a particular rotational alignment of the fiber that was determined before assembly. This alignment needs to be maintained. However, the alignment is not affected by a full 180 degree rotation between the connectors, as the polarizing direction will still be maintained. In order to use one housing for two position PM applications and four position PC and APC applications, the slots 25, 26, 27, 28 are configured in pairs. The positioning member 18 used in PC and PAC applications contains tabs 23, 24 that are flat on the end and shorter than the tabs used in PM applications. Thus, the tabs 23, 24 used in PC and APC applications will fit into any of the four slots 25, 26, 27, 28 in the front housing, creating four possible positions for the ferrule sub-assembly 13. A PM fiber uses a positioning member 18 with tabs that will only fit into one of the slot pairs (i.e., the slots 25, 27 with rounded outer ends) and thus only two positions of the ferrule sub-assembly are possible.

The area located between the slots is formed in a rounded chamfer configuration. A peak 29 is present in the center of the area between the slots, creating a pair of sloping surfaces 31, 33 leading into the two adjacent slots. This configuration allows the connector assembly to compensate for misalignment in the tuning process. For example, when the ferrule sub-assembly is depressed and rotated one quadrant, it is unlikely that the sub-assembly will be released exactly ninety degrees from the starting point. In the event that the rotation is slightly different than ninety degrees, the positioning member will contact the area between the slots when it is urged forward by the resilient member upon release from the tuning tool. The sloped configuration of this area will cause the tabs on the positioning member to slide into the adjacent slot, turning the sub-assembly to its desired position in the process.

Rotational misalignment is controlled by the relationship between the clearance fit between the positioning member and the slots in the front housing. The relationship between the positioning member and the slots is shown in FIG. 7. Two opposing constraints govern the relationship between the slots and the positioning member 18. First, it is required that the ferrule base be able to rotate freely within the cavity 71 inside the plug housing to facilitate the tuning process.

The relationship required to insure this requirement can be defined mathematically as the following:

$$I > \sqrt{\left(\frac{h}{2}\right)^2 + \left(\frac{b_i}{2} - r\right)^2} \quad \text{(Eq. 1)}$$

where (as shown on FIG. 7):

I=the inscribed circle radius of the cavity inside the plug housing;

h=distance between opposing tabs;

$b_i$=width of the tabs; and

R=radii on the tab end.

As long as I is maintains this relationship with the dimensions of the positioning member, the ferrule sub-assembly will be able to rotate freely during the tuning process.

Counteracting this requirement is the relationship required to minimize rotational misalignment. Rotational misalignment can be quantified as follows:

$$A = a\sin\left[\frac{b_o}{\sqrt{(h-2\cdot r)^2 + b_i^2}}\right] - a\tan\left(\frac{b_i}{h-2\cdot r}\right) \quad \text{(Eq. 2)}$$

where:

A=angular or rotational misalignment h=distance between opposing tabs $b_i$=width of the tabs $b_0$=slot width r=radii on the tab end Conceptually, these equations provide that, in order to minimize rotational misalignment, the size of the tabs on the positioning member should approach the size of the slots while still maintaining the requirement that the positioning member remain smaller than the inscribed circle radius of the cavity in which it resides to allow for free rotation during tuning. This results in a close clearance fit when the positioning member of the ferrule sub-assembly is engaged with the front housing, while still facilitating tuning by allowing free rotation when the ferrule sub-assembly is depressed to dis-engage the positioning member from the slots in the front housing.

Once the tuning operation is completed (i.e., the position of the ferrule sub-assembly 13 within the front housing 11 has been determined) the front face 15 of the ferrule is polished into the desired end configuration depending upon the type of contact needed. For example, the ends are polished in perpendicular to the fiber axis for a single mode PC connector or in an 8 degree bevel, relative to the fiber axis normal, is polished on the end face 15 if the desired connector is a single mode APC connector. The majority of PM connectors are already polished (using a PC PM configuration) prior to assembly and thus do not require additional polishing at this stage; however, if an APC PM configuration is desired, a final polishing process is applied at this point.

The connector assembly in accordance with the present invention provides a significant advantage over prior art connector assemblies by allowing power losses from core eccentricities to be reduced. The connector assembly in accordance with the present invention provides a simple, quick, yet efficient way to improve on fiber alignment. In addition, because the tuning process is completed after the connector assembly is assembled, the connector may be assembled at a different time and place from the tuning and polishing. This reduces assembly time and creates a cost savings. Furthermore, because the final polishing step can be performed after tuning, the connector assembly in accordance with the present invention is suitable for use with APC connectors without concerns of mis-alignment of the beveled fiber ends.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims

What is claimed is:

1. A method of assembling an optical fiber connector having an angled polished comprising the steps of:
   (a) providing a ferrule sub-assembly comprising a ferrule having a front end and a fiber secured therein and a positioning member having a front surface,
   (b) positioning said ferrule sub-assembly in a front housing adapted to receive said positioning member in a plurality of predetermined radial positions, said ferrule sub-assembly being urged forward into said front housing to hold said position member in one of said plurality of predetermined radial positions;
   (c) preparing said front end such that said fiber is suitable for optical coupling with a mating device;
   (d) accessing said front surface through the front housing to rotate the ferrule sub-assembly to at least a portion of said plurality of predetermined radial positions within the front housing while measuring the power loss associated with each radial position to determine the optimal radial position; and
   (e) angle polishing the end of the ferrule into the desired configuration after the optimum radial position is determined.

2. The method of claim 1, wherein step (a) comprises bonding a fiber within said ferrule and incorporating said ferrule into said ferrule sub-assembly.

3. The method of claim 1, wherein step (c) is performed after step (b).

4. The method of claim 1, wherein step (d) comprises:
   inserting a tool into the front of said front housing and engaging said ferrule sub-assembly;
   urging said ferrule sub-assembly backward with said tool relative to said front housing such that said positioning member disengages from said front housing thereby allowing said ferrule sub-assembly to be rotated within said connector;
   rotating said ferrule sub-assembly within said connector from a first radial position to a second radial position; and
   withdrawing said tool from said front of said front housing thereby allowing said ferrule sub-assembly to urge forward such that said positioning member engages said front housing to maintain the radial position of said ferrule sub-assembly relative to said front housing.

5. The method of claim 4, wherein, in step (d), said tool comprises at least two prongs which are received in mating slots in a front surface of said ferrule sub-assembly.

6. A connector comprising:
   (a) a ferrule sub-assembly comprising a ferrule containing an optical fiber having a front face, and a positioning member, said positioning member configured for one of at least two different connector types, a first connector type in which said positioning member comprises a first-type tab and a second connector type in which said positioning member comprises a second-type tab;

(b) a front housing adapted to receive said positioning member in a plurality of predetermined radial positions, said front housing comprising a plurality of slots, at least two slots adapted to receive said tab; said front housing has at least two different slot configurations, a first slot configuration for receiving either a first-type tab or a second-type tab and a second slot configuration for receiving only said second-type tab;

(c) a resilient member to urge said ferrule sub-assembly forward such that said positioning member engages said front housing to maintain the radial position of said ferrule sub-assembly relative to said front housing; and (d) a rear body to provide a back stop for said resilient member.

7. The connector of claim 6, wherein said first connector type is a polarization-maintaining connector.

8. The connector of claim 6, wherein said first-type tabs are larger than said second-type tabs.

9. The connector of claim 6, wherein the number of predetermined radial positions is two for said first connector type and four for said second connector type.

* * * * *